(12) United States Patent
Iso

(10) Patent No.: US 6,275,799 B1
(45) Date of Patent: *Aug. 14, 2001

(54) REFERENCE PATTERN LEARNING SYSTEM

(75) Inventor: Ken-ichi Iso, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/384,457

(22) Filed: Feb. 2, 1995

Related U.S. Application Data

(63) Continuation of application No. 08/057,410, filed on May 6, 1993, now abandoned, which is a continuation of application No. 07/971,267, filed on Nov. 4, 1992, now abandoned, which is a continuation of application No. 07/635,025, filed on Dec. 28, 1990, now abandoned.

(30) Foreign Application Priority Data

Dec. 28, 1989 (JP) .................................................. 1-344214

(51) Int. Cl.$^7$ .................................................. G10L 15/02
(52) U.S. Cl. .......................................... 704/244; 704/237
(58) Field of Search .......................... 381/41–43; 395/2, 395/2.52, 2.53, 2.46, 2.55; 704/200, 243, 244, 245, 246, 237

(56) References Cited

U.S. PATENT DOCUMENTS

| | | | |
|---|---|---|---|
| 3,816,722 | * 6/1974 | Sakoe et al. | 381/43 |
| 4,394,538 | * 7/1983 | Warren et al. | 381/43 |
| 4,401,851 | * 8/1983 | Nitta et al. | 395/2.46 |
| 4,581,756 | * 4/1986 | Togawa et al. | 704/254 |
| 4,601,054 | * 7/1986 | Watari et al. | 381/43 |
| 4,618,984 | * 10/1986 | Das et al. | 395/2.53 |
| 4,651,289 | * 3/1987 | Maeda et al. | 395/2.53 |
| 4,751,737 | * 6/1988 | Gerson et al. | 395/2.52 |
| 4,797,929 | * 1/1989 | Gerson et al. | 395/2.52 |
| 4,827,522 | * 5/1989 | Matsuura et al. | . |
| 4,914,703 | * 4/1990 | Gillick | 395/2.54 |
| 4,918,731 | * 4/1990 | Muroi | 395/2.52 |
| 4,937,870 | * 6/1990 | Bossemeyer, Jr. | 381/43 |
| 5,293,451 | * 3/1994 | Brown et al. | 395/2.54 |
| 5,479,523 | * 12/1995 | Gaborski et al. | 382/159 |

OTHER PUBLICATIONS

S.E. Levinson, L.R. Rabiner, and M.M. Sondhi, "An Introduction to the Application of the Theory of Probabilistic Functions of a Markov Process to Automatic Speech Recognition", the Bell System Technical Journal, No. 4, vol. 62, pp. 1035 to 1074, 1983.

K. Shikano, K.F. Lo, and R.Roddy, Speech Adaptive Through Vector Quantization, Proceedings of 1986 Conference on Acoustics, Speech, and Signal Processing, pp. 2643 to 2646.

* cited by examiner

Primary Examiner—David D. Knepper
(74) Attorney, Agent, or Firm—Sughrue, Mion, Zinn, Macpeak & Seas, PLLC

(57) ABSTRACT

A first parameter set constituting reference patterns of each category in speech recognition based on pattern matching with a reference pattern is to be determined from a plurality of learning utterance data. The first parameter set is determined so that a third evaluation function, represented by a sum of a first evaluation function and a second evaluation function is maximized. The first evaluation function represents a matching degree between all learning utterances and corresponding reference patterns. The second evaluation function represents a matching degree between elements of the first parameter set.

7 Claims, 3 Drawing Sheets

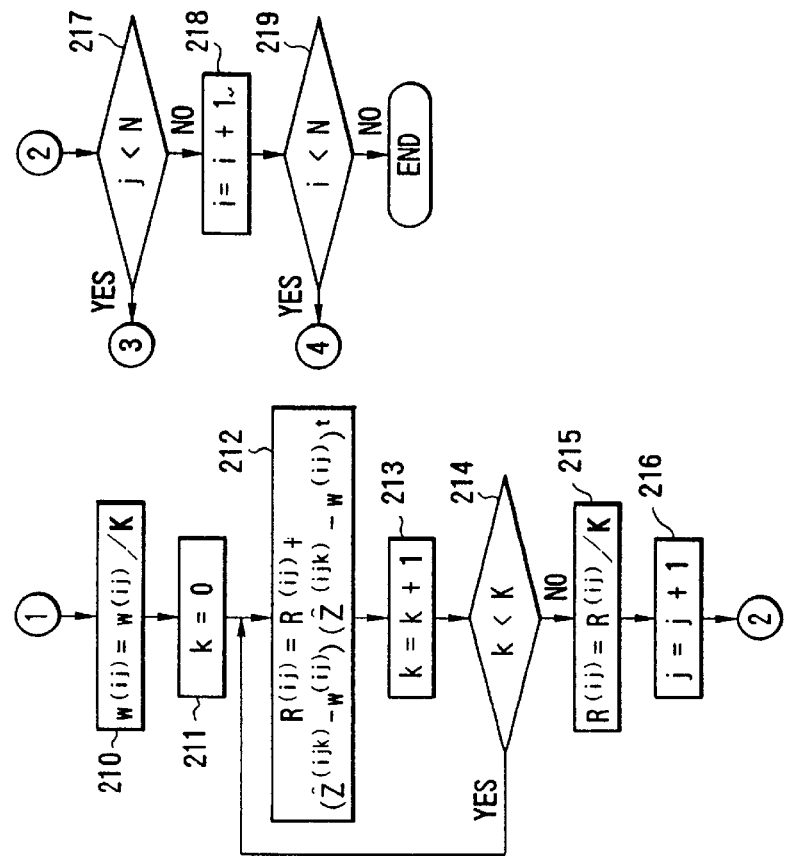
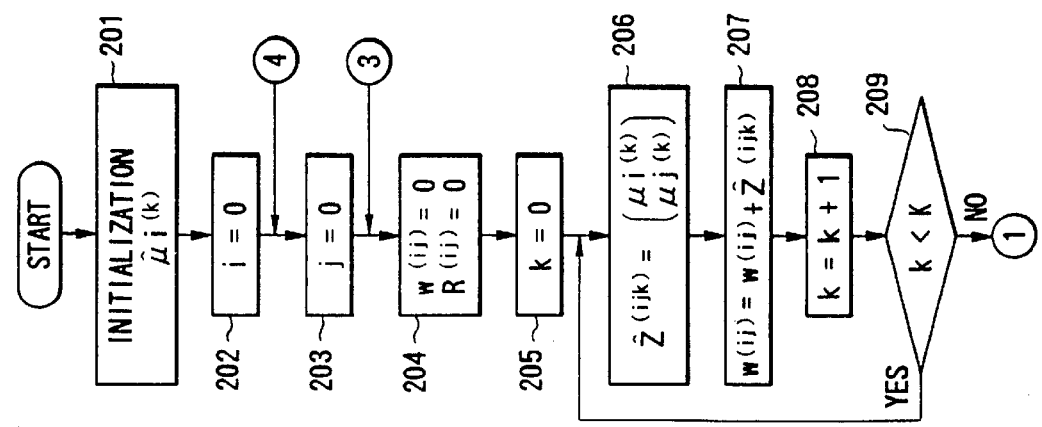
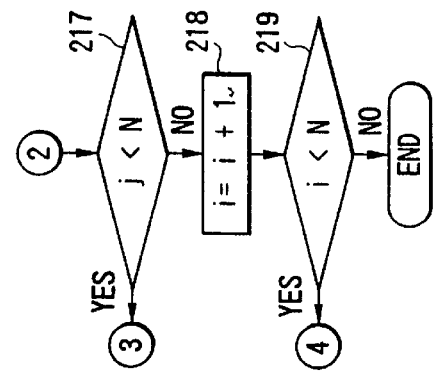

REFERENCE PATTERN LEARNING SYSTEM

This is a Continuation of Application No. 08/057,410 filed May 6, 1993 (now abandoned), which is a Continuation of Application No. 07/971,267 (now abandoned), filed Nov. 4, 1992, which is a Continuation of Application No. 07/635,025 (now abandoned), filed Dec. 28, 1990.

This is a CPA of application No. 08/384,457, filed Feb. 2, 1995, the disclosure of which is incorporated herein by reference.

BACKGROUND OF THE INVENTION

The present invention relates to a reference pattern learning system in speech recognition based on pattern matching with a reference pattern wherein a plurality of parameters which characterize reference patterns of each category are determined on the basis of a plurality of learning utterance data.

A Hidden Markov Model (to be referred to as an HMM hereinafter) is most popular as a system for recognizing a pattern represented as a feature vector time series of, e.g., speech signals. Details of the HMM are described in "Speech Recognition by Probability Model", Seiichi Nakagawa, the Institute of Electronics and Communication Engineers of Japan, 1988 (to be referred to as Reference 1 hereinafter). Further background on HMM, as well as on dynamic programming matching (herineafter DP matching) is found in "Structural Methods in Automatic Speech Recognition" by Stephen E. Levinson, Proceedings of the IEEE 1985, Vol. 73, No. 11, pp.1625–50 (to be referred to as Reference 2 heinafter. In the HMM, modeling is performed on the basis of an assumption wherein a feature vector time series is generated by a Markov probability process. An EM reference pattern is represented by a plurality of states and transitions between these states. Each state outputs a feature vector in accordance with a predetermined probability density profile, and each transition between the states accompanies a predetermined transition probability. A likelihood value representing a matching degree between an input pattern and a reference pattern is given by a probability at which a Markov probability model as a reference pattern generates an input pattern vector sequence. An interstate transition probability characterizing each reference pattern and parameters defining a probability density profile function can be determined by a "Baum-Welch algorithm" using a plurality of learning utterance data.

The "Baum-Welch algorithm" as a statistical learning algorithm requires a large volume of learning data to determine model parameters. A new user must utter a lot of speech inputs, resulting in inconvenience and impractical applications. In order to reduce the load on a new user, there are available several speaker adaptive systems for adaptively applying a recognition apparatus to a new speaker by using a relatively small number of utterances by the new speaker. Details of the speaker adaptive system are described in "Speaker Adaptive Techniques for Speech Recognition", Sadaoki Furui, The Journal of the of Television Society, Vol. 43, No. 9, 1989, pp. 929–934 (to be referred to as Reference 3 hereinafter). See also "Speaker Adaptation for Demi-Syllable Based Continuous Density HMM" by Koichi Shinoda et al., Proc. ICASSP 1991, pp. 857–860.

The most important point in the speaker adaptive modeling system is the way of estimating parameters of a model representing an acoustic event not contained in a small number of adaptive utterances by a new user and the way of adaptively modeling using these parameters. In each of the existing speaker adaptive modeling systems, a similarity between acoustic events is basically defined using a physical distance between feature vectors as a measure, parameters of a model representing acoustic events not appearing in the adaptive utterances are estimated on the basis of the similarity, and adaptive modeling is performed using these parameters.

In the existing speaker adaptive modeling systems, by using reference patterns prepared in advance and adaptive utterance data of a new user, a similarity between acoustic events is basically defined using a physical distance between feature vectors as a measure, parameters of a model representing acoustic events not appearing in the adaptive utterances are estimated on the basis of the similarity, and adaptive modeling is performed using these parameters.

In adaptive modeling on the basis of estimation in accordance with the above physical distance, recognition precision can be improved as compared with that prior to adaptive modeling. However, a recognition result is far from recognition performance by reference patterns of a specific speaker which are constituted by a sufficient amount of utterance data, as can be apparent from experiment results described in the above references.

SUMMARY OF THE INVENTION

It is an object of the present invention to provide a reference pattern learning system capable of estimating a high-precision reference pattern very close to a reference pattern generated by a large amount of utterance data by a specific speaker, by using data associated with correlation between all acoustic events obtained from a large number of utterances of a large number of speakers in advance in addition to adaptive utterance data obtained by a small number of utterances by a new user.

In order to achieve the above object of the present invention, there is provided a reference pattern learning system wherein when a first parameter set constituting reference patterns of each category in speech recognition based on pattern matching with a reference pattern is to be determined from a plurality of learning utterance data, the first parameter set is determined so that a third evaluation function represented by a sum of a first evaluation function representing a matching degree between all learning utterances and corresponding reference patterns and a second evaluation function representing a matching degree between elements of the first parameter set is maximized.

BRIEF DESCRIPTION OF THE DRAWINGS

FIGS. 2A–2C are flow charts for automatically determining parameters for defining a likelihood function representing a matching degree between vector parameters constituting the reference pattern, by using a large amount of utterance data by a large number of speakers, in accordance with a method according to another embodiment of the present invention.

DESCRIPTION OF THE PREFERRED EMBODIMENTS

Figure 1A:
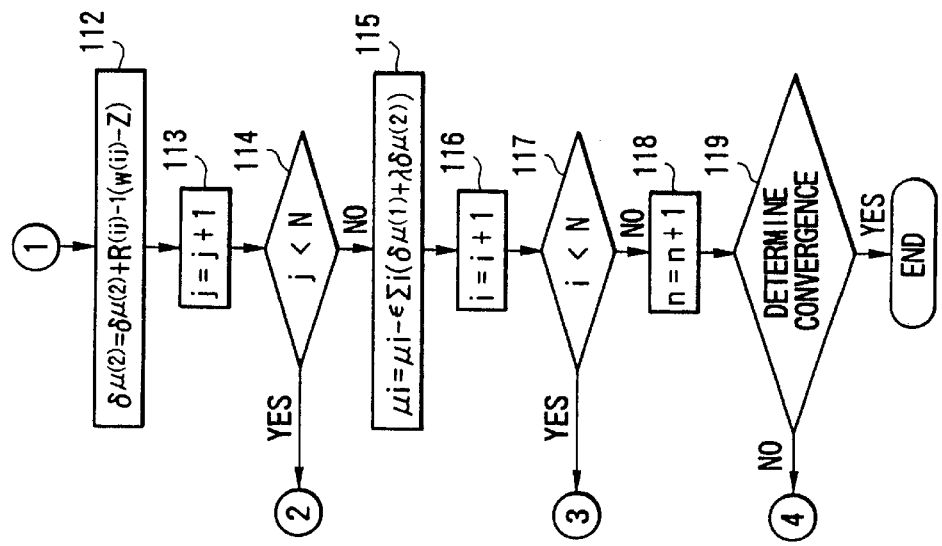
FIGS. 1A and 1B are flow charts for automatically generating a reference pattern from a small amount of utterance data by a new user in accordance with a reference pattern learning system according to an embodiment of the present invention.

Before preferred embodiments of the present invention will be described in detail, the principle of the present invention, i.e., a reference pattern learning system utilizing knowledge about an unspecified speaker, will be described in detail below.

Assume that a reference pattern of each target recognition category is represented by a set of D-dimensional vector parameters. Each reference pattern may have additional parameters. In the following description, a model including these parameters may be easily applied. However, since additional parameters complicate mathematical expressions, the additional parameters are excluded in the following description. Sets of vector parameters constituting all reference patterns are systematized, consecutive numbers are assigned to different vector parameters, and the i-th vector parameter is defined as $\mu_i$. In this case, a learning evaluation function $L(\mu_1, \mu_2, \ldots, \mu_N)$ is defined as follows:

$$L_1(\mu_1, \ldots, \mu_N) = \sum_w \ln P(w, \mu_1, \ldots, \mu_N) \tag{2}$$

$$L_2(\mu_1, \ldots, \mu_N) = \frac{1}{2}\sum_{i,j} \ln Q(\mu_1, \mu_j, \Lambda^{(ij)}) \tag{3}$$

In the above equations, the variable w represents learning utterance data, a sum of values of the variable w is a sum of all learning utterances, and $\lambda$ is an appropriate constant. $L_1 (\mu_1, \ldots, \mu_N)$ is a likelihood value representing a matching degree between each of all the learning utterances and a corresponding reference pattern. This value corresponds to a logarithmic likelihood value for causing each HMM reference pattern to generate a learning utterance when the HMM is used as a recognition scheme. When DP matching or the like is used, the likelihood value corresponds to a total sum of distances between patterns. HMM and DP matching are described in Reference 1 and in Chapters III (DP matching—nonparametric methods) and IV (HMM—parametric method) of Reference 2 in detail.

$L_2 (\mu_1, \ldots, \mu_N)$ is a likelihood value generally representing a matching degree between all the vector parameters. However, for the sake of descriptive simplicity, $L_2$ can express a total sum of all vector parameter pairs (i,j) of the likelihood value $\ln Q(\mu_1, \mu_j, \Lambda^{(ij)})$ representing a matching degree between the vector parameters $\mu_i$ and $\mu_j$. The following method is applicable to simultaneous correlation of two or more points. In the above equation, $\Lambda^{(ij)}$ is a representative of a plurality of parameters defining the likelihood value function lnQ. The function Q can be exemplified as a simultaneous probability density profile function of probability variables ($\mu_i, \mu_j$) and can be expressed as a multidimensional Gaussian distribution. In this case, $\Lambda^{(ij)}$ is a correlation matrix with an average vector of the Gaussian distribution.

Information associated with correlation between all acoustic events obtained from a large number of utterances from a large number of speakers can be expressed as this parameter $\Lambda^{(ij)}$ An example will be described below. A plurality of vector parameter pairs obtained by a reference pattern generation method (Baum-Welch method in HMM or clustering method in DP matching) corresponding to an employed recognition method from a large number of utterances from a large number of speakers are defined as ($\mu_i^{(k)}$, $\mu_j^{(k)}$). In these pairs, superscript suffix (k) differentiates a plurality of vector parameters from each other. For example, when reference patterns are created in units of speakers, the suffix indicates each specific speaker. In this case, the plurality of parameters $\Lambda^{(ij)}$ defining the function $Q(\mu_i, \mu_j, \Lambda^{(ij)})$ are estimated to maximize the function Q by using a large number of data ($\mu_i^{(k)}$, $\mu_j^{(k)}$).

When a multidimensional Gaussian distribution is employed as the function Q, a mathematical expression is given as follows:

$$Q(\mu_i, \mu_j, \Lambda^{(ij)}) = \text{Gauss}(z^{(ij)} - w^{(ij)}, R^{(ij)}) \tag{4}$$

$$z^{(ij)} = \begin{pmatrix} \mu_i \\ \mu_j \end{pmatrix} \tag{5}$$

$$\Lambda^{(ij)} = \{w^{(ij)}, R^{(ij)}\} \tag{6}$$

$$\text{Gauss}(z - w, R) = \frac{1}{(2\pi)^{M/2}|R|^{1/2}} \exp\left[-\frac{1}{2}(z-w)^t R^{-1}(z-w)\right] \tag{7}$$

In this case, estimation of the parameter $\Lambda^{(ij)}$ corresponds to estimation of a correlation matrix (2D rows×2D columns) $R^{(ij)}$ and the 2D-dimensional average vector $w^{(ij)}$ of the simultaneous probability density profile function for the probability variables $\mu_i$ and $\mu_j$. This estimated value is obtained by the following equations from the k (k=1 . . . K) vector parameter pairs ($\mu_i^{(k)}$, $\mu_j^{(k)}$) created from the large number of utterances of the large number of speakers:

$$\hat{z}^{(ijk)} = \begin{pmatrix} \hat{\mu}_i^{(k)} \\ \hat{\mu}_j^{(k)} \end{pmatrix} \tag{8}$$

$$w^{(ij)} = \frac{1}{K}\sum_{k=1}^{K} \hat{z}^{(ijk)} \tag{9}$$

$$R^{(ij)} = \frac{1}{K}\sum_{k=1}^{K} (\hat{z}^{(ijk)} - w^{(ij)})(\hat{z}^{(ijk)} - w^{(ij)})^t \tag{10}$$

When the parameter $\Lambda^{(ij)}$ representing information associated with correlation between acoustic events from a large amount of utterance data of a large number of speakers is determined, in order to determine a vector parameter $\mu_i$ constituting a new reference pattern from a small amount of adaptive utterance data uttered by a new user by using this information, the learning evaluation function defined by equation (1) is maximized for $\mu_i$. In this case, $\Lambda^{(ij)}$ determined as described above is used as the evaluation function parameter to reflect knowledge associated with an unspecified speaker on learning.

When the multidimensional Gaussian distribution described above is employed as the function Q in consideration of the HMM in which a state vector output probability density distribution function serves as a single Gaussian distribution function as a recognition system, maximization of the evaluation function can be performed on the basis of the following steepest descent method.

In this case, the vector parameter $\mu_i$ characterizing the reference pattern is given as an average vector of the Gaussian distribution of state i in HMM. HMM symbols are defined as described below, as indicated in Reference 1 and in Chapter IV (HMM—parametric methods) of Reference 2.

$$P(w) = \sum_{i,j} \alpha_t(i) a_{ij} b_j(O_{t+1}) \beta_{t+1}(j) \quad (11)$$

$$b_i(x) = \frac{1}{(2\pi)^{D/2} |\Sigma_i|^{1/2}} \exp\left[-\frac{1}{2}(x-\mu_i)^t \sum_{1}^{-1}(x-\mu_i)\right] \quad (12)$$

where P(w) is the HMM likelihood function for a learning utterance w (word or sentence), $\alpha_t(i)$ is the forward probability at time t in state i, $\beta_t(i)$ is the backward probability at time t in state i, $a_{ij}$ is the transition probability between states i and i, $b_i(x)$ is the probability at which state i outputs a vector x, and the parameter $\Sigma_i$ represents a covariance matrix of state i. The meanings of these symbols are described in Reference 1 in detail. In order to perform the steepest descent method for the evaluation function L in equation (1), derivative functions of L by $\mu_i$ are required as follows:

$$\frac{\partial L_1(\mu_1, \ldots, \mu_N)}{\partial \mu_i} = \sum_W P(W)^{-1} \frac{\partial P(W)}{\partial \mu_i} \quad (13)$$

$$\frac{\partial P(W)}{\partial \mu_i} = \sum_{t,j} \alpha_t(j) a_{ji} b_j(O_{t+1}) \sum_{i}^{-1} (O_{t+1} - \mu_i) \beta_{t+1}(i) \quad (14)$$

$$\frac{\partial L_2(\mu_1, \ldots, \mu_N)}{\partial \mu_i} = \sum_j (R^{(ij)})^{-1}(w^{(ij)} - z^{(ij)}) \quad (15)$$

In the steepest descent method, all the vector parameters are sequentially updated from an appropriate initial value so as to be proportional to this derivative function. An updating expression of the vector parameter $\mu_{i(n)}$ is given as follows:

$$\mu_i^{(n)} = \mu_i^{(n-1)} + \varepsilon \sum_i \frac{\partial L}{\partial \mu_i} \quad (16)$$

where n is the repetition count, $\varepsilon$ is a constant, and $\Sigma_i$ is the covariant matrix for matching the dimensions of the derivative function.

The above description has been concerned with the first and second embodiments of the present invention, and a description will be made for other embodiments. In this case, a plurality of vector parameter pairs constituted by a large amount of utterance data of a large number of speakers is defined as $(\hat{\mu}_i^{(k)}, \hat{\mu}_j^{(k)})$. The superscript suffix (k) discriminates the plurality of vector parameters from each other. A reference vector parameter formed by a given method is defined as $\mu_i$ (i=1...N). The reference vector parameter can be exemplified as a representative speaker's reference pattern. In this case, a difference vector between the kth vector parameter $\bar{\mu}_i^{(k)}$ and the reference vector parameter $\bar{\mu}$ is defined as sample data $\Delta_i^{(k)}$ of a correction vector $\Delta_i$:

$$\Delta_i^{(k)} = \hat{\mu}_i^{(k)} - \bar{\mu}_i \quad (17)$$

The learning evaluation function is defined by the reference vector parameter $\mu_i$ and the correction vector $\Delta_i$ for the new speaker's reference pattern as follows:

$$L(\Delta_i, \ldots, \Delta_N) = \quad (18)$$

$$\sum_W \ln P(w, \bar{\mu}_1 + \Delta_1, \ldots, \bar{\mu}_N + \Delta_N) \frac{\lambda}{2} \sum_{i,j} \ln Q(\Delta_i, \Delta_j, \Lambda^{(ij)})$$

The learning target is not the vector parameter itself but its correction vector, unlike the first and second embodiments. The parameter $\Lambda^{(ij)}$ representing information obtained from the large amount of utterance data of the large number of speakers represents knowledge associated with the matching degree between the correction vectors $\Delta_i$ and $\Delta_j$ of the vector parameter $\mu_i$. This parameter $\Lambda^{(ij)}$ can be determined by using the sample data $\Delta_i^{(k)}$ obtained by the large number of utterances of the large number of speakers in the same manner as in the method of the second embodiment.

Learning of reference patterns of new users can be performed by adding correction vectors obtained by maximizing the evaluation function to the corresponding vector parameters. More specifically, the steepest descent method described with reference to the first and second embodiments can be used.

In the above description, the HMM is used as a recognition scheme. The present invention is also applicable to another speech recognition scheme based on pattern matching between input patterns and reference patterns.

Preferred embodiments will be described in detail with reference to the accompanying drawings.

Figure 1B:
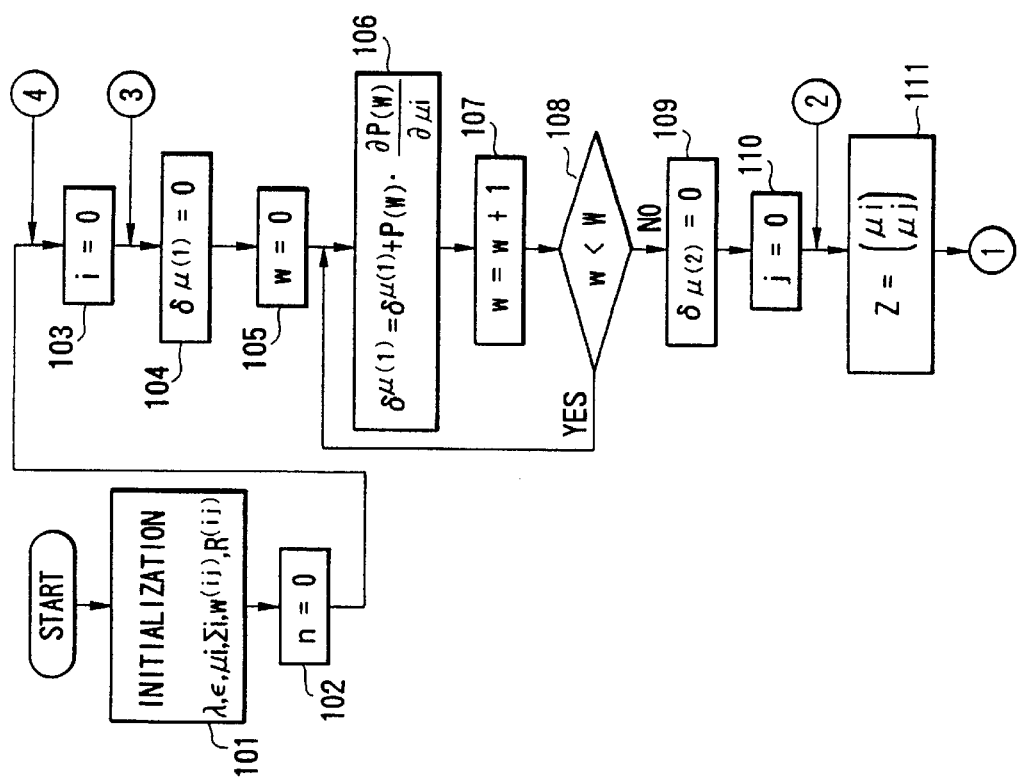

FIGS. 1A and 1B are flow charts of reference pattern learning by a reference pattern learning scheme according to the first embodiment of the present invention. In this embodiment, the single Gaussian distribution HMM is used as a recognition scheme in the same manner as in Reference 1, (see also Equation (63) in Chapter IV of Reference 2 and a multidimensional Gaussian distribution is employed as a likelyhood function representing a matching degree between vector parameters constituting a reference pattern. This corresponds to the calculation described above, and variable representations and the like in this embodiment denote the same as those described above.

Necessary parameters are initialized in step 101. These parameters are $\lambda$, $\varepsilon$, and $\mu_i$, $\Sigma_i$, $w^{(ij)}$, and $R^{(ij)}$ of all i and j values. Counters are initialized in steps 102 and 103.

Operations in steps 104 to 108 are performed to calculate $\partial L_1 / \partial L \mu_1$ in accordance with equation (13). In step 104, the initial value of the first correction amount $\delta \mu u(1)$ of the vector parameter $\mu_i$ is set to zero. In step 105, the counter associated with learning utterance is initialized. In step 106, a value for HMM is calculated by equation (14). In step 107, the counter is incremented by one, and the calculations are performed in step 106 until the maximum count W is reached.

In the operations in steps 109 to 114, $\partial L_2 / \partial \mu_i$ is calculated in accordance with equation (15). In step 109, the initial value of the second correction value $\delta \mu$ (2) of the vector parameter $\mu_i$ is set to zero. In step 110, the counter is initialized. The second correction values are accumulated in steps 111 and 112 in accordance with equation (15). In step 113, the counter is incremented by one. Calculations are performed in step 112 until the maximum value N of the vector parameter is reached.

The vector parameters are corrected in accordance with equation (16) in step 115. In step 119, convergence of the sequential correction in accordance with the steepest descent method of the vector parameters is determined. If no convergence is detected, the flow returns to step 103, and calculations of the correction values are continued. The convergence is determined in accordance with whether the sequential correction count n exceeds a predetermined constant or whether the improvement value of the evaluation function L is less than a predetermined value, or in accordance with a combination thereof.

FIGS. 2A–2C are flow charts for determining parameters representing information associated with correlation between all acoustic events from a large number of utterances of a large number of speakers according to the second embodiment of the present invention. This flow chart represents that a multidimensional Gaussian distribution is employed as a likelihood function representing a matching degree between vector parameters constituting a reference pattern. In this case, the parameter $\Lambda^{(ij)} = \{w^{(ij)}, R^{(ij)}\}$ for maximizing the likelihood value can be directly calculated in accordance with equations (9) and (10). Processing will be described with reference to the flow chart. In step 201, a plurality of reference patterns determined from the large amount of utterance data from the large number of speakers are initialized. In steps 202 to 219, the average value $w^{(ij)}$ and the variance $R^{(ij)}$ are calculated in accordance with equations (9) and (10).

Figure 3C:
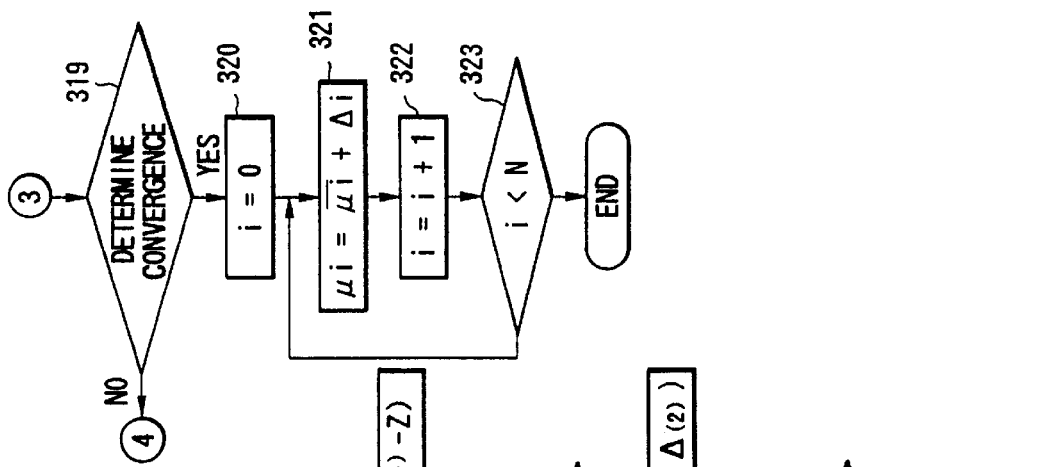
FIGS. 3A–3C are flow charts for automatically generating a reference pattern from a small amount of utterance data by a new user in accordance with a reference pattern learning system according to still another embodiment of the present invention.
Figure 3B:
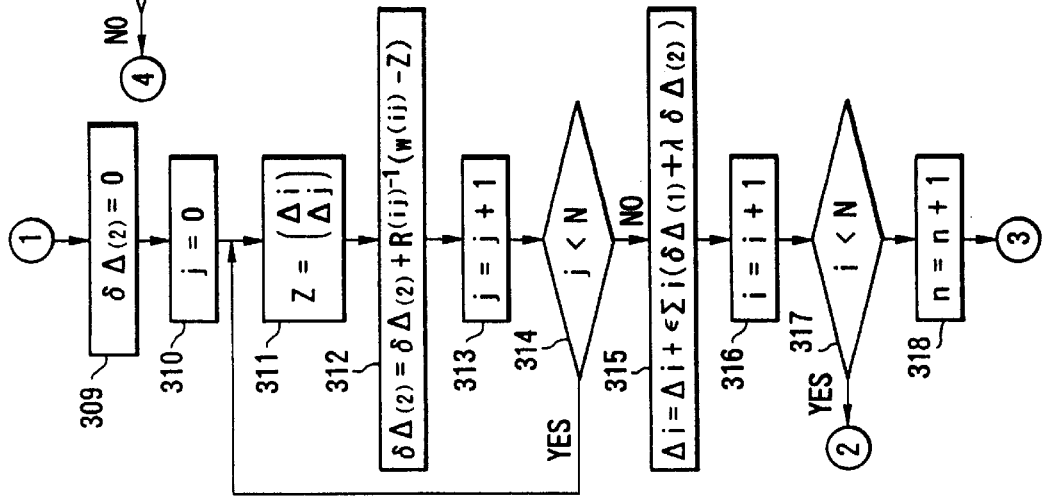
Figure 3A:
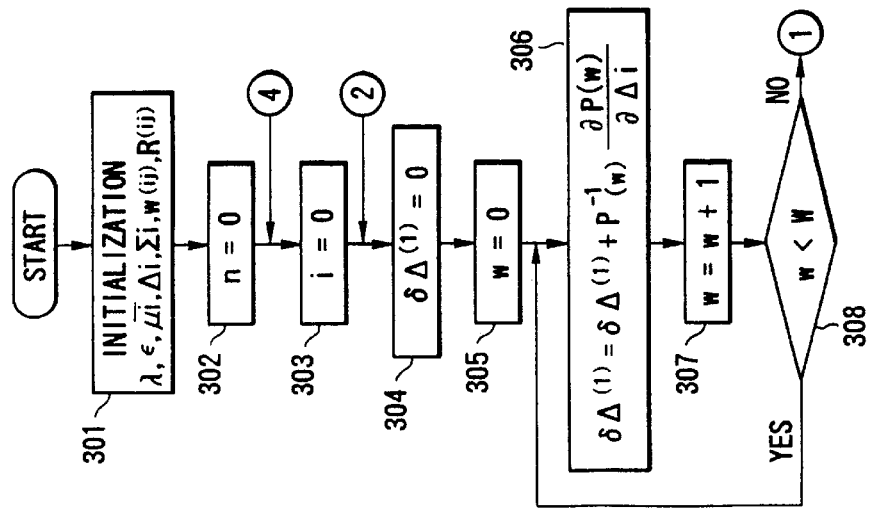

FIGS. 3A–3C are flow charts of reference pattern learning according to a reference pattern learning scheme according to the third embodiment of the present invention. In this flow chart, a single Gaussian distribution HMM scheme is used as a recognition scheme, and a matching degree between correction values of vector parameters constituting a reference pattern is expressed by a multidimensional Gaussian distribution. This embodiment corresponds to the calculations described with reference to the principle of the present invention, and variables in this embodiment have the same meanings as those in the above description. Processing will be described with reference to the flow chart below.

In step 301, necessary parameters are initialized. These parameters are $\lambda$, $\epsilon$, and $\bar{\mu}_i$, $\Delta_i$, $\Sigma_i$, $w^{(ij)}$, and $R^{(ij)}$ associated with all i and j values. $\bar{\mu}_i$ is a representative reference pattern obtained in advance from a large amount of utterance data from a large number of speakers. In steps 302 to 319, the vector parameter $\mu_i$ is substituted with the correction amount $\Delta_i$ in FIGS. 1A and 1B. In steps 320 to 323, the calculated correction vector $\Delta_i$ is added to the vector parameter $\bar{\mu}_i$ representing the representative reference pattern, thereby transforming the reference pattern to an optimal reference pattern for a new user.

The parameters $w^{(ij)}$ and $R^{(ij)}$ defining a likelihood function representing a matching degree between the correction amounts of the vector parameters can be automatically determined by using a large amount of utterance data of a large number of speakers according to the fourth embodiment of the present invention. When a multidimensional Gaussian distribution is employed as a likelihood function, $\mu$ is replaced with $\Delta$ in the method of the flow charts of FIGS. 2A–2C to calculate an optimal value of the parameter.

According to the present invention, as has been described above, there is provided a reference pattern learning system wherein, in addition to a small amount of adaptive utterance data produced by new users, information associated with correlation between all acoustic events obtained by a large amount of utterances of a large number of speakers is used, high-precision reference pattern very close to the reference pattern generated by a large amount of utterance data of unspecified speakers can be obtained.

What is claimed is:

1. A method of generating reference patterns for a new speaker in a speech recognition system including a plurality of existing speakers, where the new speaker's speech will be compared with reference patterns obtained in advance from each of said plurality of existing speakers in order to recognize the new speaker's speech, the method comprising the steps of:

(a) generating a plurality of sets of speech recognition reference pattern data wherein each of said sets contain data representing more than one word, one set of reference pattern data is generated for each of said plurality of existing speakers by using speech utterance data from each of said plurality of existing speakers;

(b) analyzing said plurality of sets of reference pattern data by calculating correlation between parameters of the reference patterns such that correlations are calculated for all sets of phonemes present in the plurality of sets of speech recognition reference pattern data; and (c) generating a set of reference pattern data for said new speaker based only on the results of the analysis of said analyzing step (b) and on special utterance data from said new speaker which correspond to only a portion of said one set of reference pattern data, said special utterance data being substantially less than said speech utterance data from each of said plurality of existing speakers used in said generating step (a).

2. A method of generating reference patterns for a new speaker in a speech recognition system as claimed in claim 1, wherein the speech utterance data is obtained by digitizing speech utterances from each of said plurality of existing speakers and converting the digitized data to a feature vector time series through a fast Fourier transform.

3. A method of generating reference patterns for a new speaker in a speech recognition system as claimed in claim 2, wherein the plurality of sets of speech recognition reference pattern data is generated from the feature vector time series using the Baum-Welch algorithm.

4. A method of generating reference patterns for a new speaker in a speech recognition system as claimed in claim 1 wherein the analyzing step includes generating a correlation parameter using each of the plurality of sets of speech recognition reference pattern data.

5. A method of generating reference patterns for a new speaker in a speech recognition system as claimed in claim 4, wherein the special utterance data from said new speaker is obtained by digitizing speech utterances from the new speaker and converting the digitized data to a feature vector time series through a fast Fourier transform.

6. A method of generating reference patterns for a new speaker in a speech recognition system as claimed in claim 5, wherein the set of reference pattern data for said new speaker is generated by analyzing the special utterance data from the new speaker in conjunction with the correlation parameter generated in the analyzing step.

7. A method of generating reference patterns as set forth in claim 4 wherein the correlation parameter is a correlation coefficient between mu of a certain probability distribution in an acoustic model of one phoneme and mu of another probability distribution in an acoustic model of another phoneme.

* * * * *